H. GRIMMELMANN.
MANUFACTURING OF INDIA RUBBER SUCKERS PROVIDED WITH VALVE PROJECTURES.
APPLICATION FILED AUG. 26, 1920.
1,381,185.
Patented June 14, 1921.
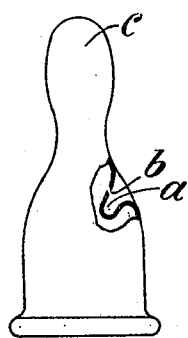
Inventor
H. Grimmelmann,
By H. R. Kerslake.
Attorney

UNITED STATES PATENT OFFICE.

HERMANN GRIMELMANN, OF WALLISELLEN, SWITZERLAND.

MANUFACTURING OF INDIA-RUBBER SUCKERS PROVIDED WITH VALVE-PROJECTURES.

1,381,185.  Specification of Letters Patent.  Patented June 14, 1921.

Application filed August 26, 1920. Serial No. 406,163.

*To all whom it may concern:*

Be it known that I, HERMANN GRIMELMANN, a citizen of Switzerland, residing at Rosenbergstrasse 273, Wallisellen, in the county of Zurich and State of Switzerland, have invented certain new and useful Improvements in and Relating to the Manufacturing of India-Rubber Suckers Provided with Valve-Projectures, of which the following is a specification.

This invention relates to india rubber nipples provided with a valve-projection and has especially for its object to provide a new method of manufacturing such nipples so that a correctly operating valve will be obtained in said projection.

On the drawing an example of an india rubber nipple made according to the present invention is shown in longitudinal view, the valve projection being shown in section.

*a* represents the valve projection provided with a lip valve *b*, this projection being integral with the other part *c* of the nipple and being adapted to turn inside out.

For the method of manufacturing this nipple the following examples may be given:

*First example.*—The nipple is brought to the desired shape and thickness by repeatedly dipping a suitable mold into a solution of india rubber in the well known manner. That part (core) of said mold which corresponds to the valve projection extends outwardly from the core. The nipple is then preliminarily vulcanized and pulled off from the mold by turning it inside out so that its former outer surface together with the valve projection lies within the nipple. Then the nipple is turned to its first position. Now the valve projection is turned inside out alone so that it projects inwardly. A mold is then put into this projection from the exterior and the entire nipple receives then a final vulcanization. At last the valve opening *b* is made in the valve projection by means of a sharp instrument.

By turning the valve projection *a* inside out after the preparatory first vulcanization and vulcanizing it in the turned condition, it obtains the same tension on its exterior as on its interior. In other words, the tension which is given to it by turning it inside out after the preparatory vulcanization is equalized by the reforming, viz. by putting of a mold into the valve projection and the subsequent final vulcanization. Therefore, no tension is released when cutting the opening of the lip-valve *b* in the valve projection. The edges of the cut are not drawn one from another, as would be the case if the valve-projection were not reformed before the second, final revulcanization but left in the same position it had at the preliminary vulcanization.

*Second example.*—This method is the same as the above described until the point where the preliminary vulcanized nipple has been pulled off from the mold. The nipple with the exception of the valve projection is in the turned condition in this stage of manufacturing, as before described. At said pulling off, the valve projection, however, has not been turned, but only the other, greater part of the nipple. Now the latter is placed upon a suitable mold, the former projects inwardly. The whole is then finally vulcanized and the valve cut made.

In this second example the valve projection *per se* has always the same position on the nipple ready for use, since it, though initially directed outwardly, comes to lie on the inside by the turning of the body of the nipple, without being itself turned and strained thereby. The body of the nipple, however, has obtained a tension by the turning which tension is equalized by reforming, that is to say, by bringing the nipple upon another mold and finally vulcanizing it thereupon, in order that the suction aperture at the top of the nipple shall not become widened under the influence of such tension. Such enlargement would make the nipple unserviceable.

The form and dimensions of the valve projection and the body of the nipple may vary. For example the valve projection may have the form of a ball. The valve aperture may be made by a cut at right angle through the valve wall instead of by one obliquely as in the lip-valve shown on the drawing.

The present method permits a number of nipples to be manufactured simultaneously as is the case in the methods for manufacturing the known nipples.

What I claim is:

1. A method of manufacturing india rubber nipples provided with a valve projection consisting in repeatedly dipping a suitable core into a solution of india rubber until a hollow nipple with a valve projection is formed thereon, preliminarily vulcanizing the rubber upon the core after a suitable number of dippings, removing the nipple thus formed from the core, turning the nipple inside out, turning the valve projection inwardly, placing a suitable mold into the valve projection, vulcanizing the entire nipple, and finally cutting an aperture in the valve projection.

2. A method of manufacturing india rubber nipples provided with a valve projection consisting in repeatedly dipping a core having a lateral projection into a solution of india rubber until a hollow nipple with a hollow valve projection is formed thereon, preliminarily vulcanizing the rubber upon the core after a suitable number of dippings, removing the nipple thus formed from the core, reforming one of the hollow parts of the nipple by placing the same upon a second core in reversed position to that occupied upon the first core, again vulcanizing the last mentioned hollow part of the nipple, and finally making a sharp cut into the valve projection.

In testimony whereof I have affixed my signature.

HERMANN GRIMELMANN.